United States Patent [19]

Riffe et al.

[11] Patent Number: 4,502,111
[45] Date of Patent: Feb. 26, 1985

[54] TOKEN GENERATOR

[75] Inventors: Josephus Riffe, Plantation; Richard Rice, West Palm Beach, both of Fla.

[73] Assignee: Harris Corporation, Melbourne, Fla.

[21] Appl. No.: 268,370

[22] Filed: May 29, 1981

[51] Int. Cl.³ .............................................. G06F 13/00
[52] U.S. Cl. ..................................................... 364/200
[58] Field of Search ................................ 364/200, 900

[56] References Cited

U.S. PATENT DOCUMENTS

| 3,581,287 | 5/1971 | Greenspan | 364/200 |
|---|---|---|---|
| 3,875,391 | 4/1975 | Shapiro | 364/200 |
| 4,025,771 | 3/1977 | Lynch, Jr. | 364/200 |
| 4,075,688 | 2/1978 | Lynch, Jr. | 364/200 |
| 4,079,451 | 3/1978 | Woods | 364/200 |
| 4,109,310 | 8/1978 | England | 364/200 |
| 4,194,241 | 3/1980 | Mager | 364/200 |
| 4,236,206 | 11/1980 | Strecker | 364/200 |
| 4,335,277 | 6/1982 | Puri | 364/900 |

Primary Examiner—James D. Thomas
Assistant Examiner—David Y. Eng
Attorney, Agent, or Firm—Antonelli, Terry & Wands

[57] ABSTRACT

An arrangement for identifying and disassembling a series of instructions of variable length stored in a prefetch buffer includes a set of controlled multiplexer circuits for selectively transferring the contents of specified register of the prefetch buffer to a ring or loop-configured shift registers, termed a "byte rotator", which functions as a temporary adjustable storage device. That portion of the byte rotator which contains the opcode token of the instruction read out of the prefetch buffer is decoded to determine the length of each token. Once the length of the first token is known, it can be determined where the second or next token begins. In the same fashion, each successive token is transferred to the byte rotator until all tokens for the current instructions have been used. The next token is the opcode for the following instruction. Each time the byte rotator is loaded with a new series of tokens, as multiplexed out of the prefetch buffer, its contents are rotated by an amount based upon the length of the previous token, in order that the lowermost or first stage of the byte rotator will contain the next token of the instruction, whereby the above decoding procedure may again be carried out. The controlled rotation of the contents of the byte rotator also causes the sequence of tokens of the instruction to be transferred to the token register to be arranged in the proper order for transfer.

20 Claims, 9 Drawing Figures

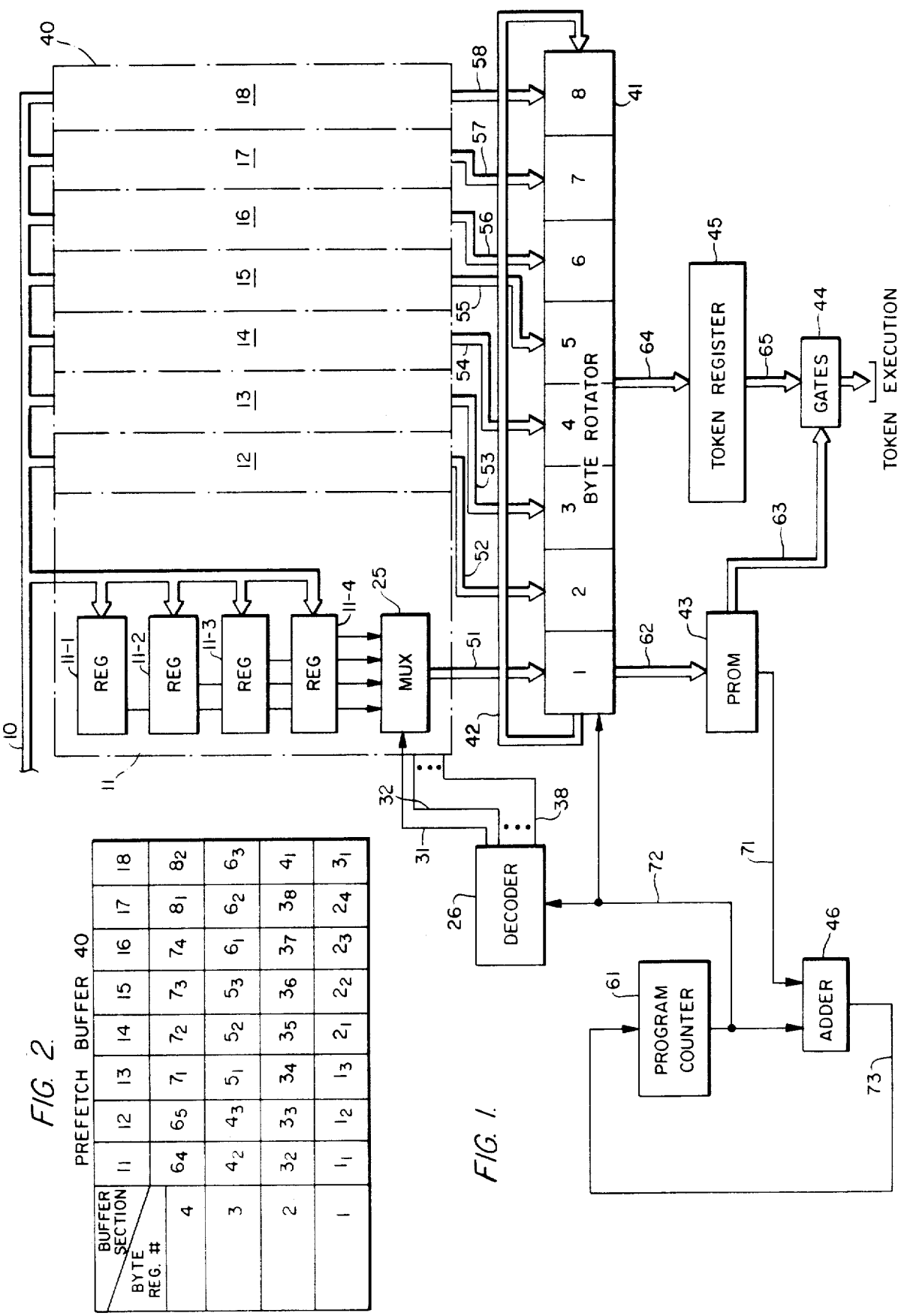

FIG. 3A.

| PROGRAM COUNTER = 0 | LOAD | $I_1$ | $I_2$ | $I_3$ | $2_1$ | $2_2$ | $2_3$ | $2_4$ | $3_1$ |
|---|---|---|---|---|---|---|---|---|---|
| | ROTATE | $I_1$ | $I_2$ | $I_3$ | $2_1$ | $2_2$ | $2_3$ | $2_4$ | $3_1$ |

UTILIZE 3 BYTES ∴ INCREMENT P.C. BY 3

FIG. 3B.

| PROGRAM COUNTER = 3 | LOAD | $3_2$ | $3_3$ | $3_4$ | $2_1$ | $2_2$ | $2_3$ | $2_4$ | $3_1$ |
|---|---|---|---|---|---|---|---|---|---|
| | ROTATE | $2_1$ | $2_2$ | $2_3$ | $2_4$ | $3_1$ | $3_2$ | $3_3$ | $3_4$ |

UTILIZE 4 BYTES ∴ INCREMENT P.C. BY 4

FIG. 3C.

| PROGRAM COUNTER = 7 | LOAD | $3_2$ | $3_3$ | $3_4$ | $3_5$ | $3_6$ | $3_7$ | $3_8$ | $3_1$ |
|---|---|---|---|---|---|---|---|---|---|
| | ROTATE | $3_1$ | $3_2$ | $3_3$ | $3_4$ | $3_5$ | $3_6$ | $3_7$ | $3_8$ |

UTILIZE 8 BYTES ∴ INCREMENT P.C. BY 8

FIG. 3D.

| PROGRAM COUNTER = 15 | LOAD | $4_2$ | $4_3$ | $5_1$ | $5_2$ | $5_3$ | $6_1$ | $6_2$ | $4_1$ |
|---|---|---|---|---|---|---|---|---|---|
| | ROTATE | $4_1$ | $4_2$ | $4_3$ | $5_1$ | $5_2$ | $5_3$ | $6_1$ | $6_2$ |

UTILIZE 3 BYTES ∴ INCREMENT P.C. BY 3

FIG. 3E.

| PROGRAM COUNTER = 18 | LOAD | $6_4$ | $6_5$ | $5_1$ | $5_2$ | $5_3$ | $6_1$ | $6_2$ | $6_3$ |
|---|---|---|---|---|---|---|---|---|---|
| | ROTATE | $5_1$ | $5_2$ | $5_3$ | $6_1$ | $6_2$ | $6_3$ | $6_4$ | $6_5$ |

UTILIZE 3 BYTES ∴ INCREMENT P.C. BY 3

FIG. 3F.

| PROGRAM COUNTER = 21 | LOAD | $6_4$ | $6_5$ | $7_1$ | $7_2$ | $7_3$ | $6_1$ | $6_2$ | $6_3$ |
|---|---|---|---|---|---|---|---|---|---|
| | ROTATE | $6_1$ | $6_2$ | $6_3$ | $6_4$ | $6_5$ | $7_1$ | $7_2$ | $7_3$ |

UTILIZE 5 BYTES ∴ INCREMENT P.C. BY 5

FIG. 3G.

| PROGRAM COUNTER = 26 | LOAD | $8_3$ | $9_1$ | $7_1$ | $7_2$ | $7_3$ | $7_4$ | $8_1$ | $8_2$ |
|---|---|---|---|---|---|---|---|---|---|
| | ROTATE | $7_1$ | $7_2$ | $7_3$ | $7_4$ | $8_1$ | $8_2$ | $8_3$ | $9_1$ |

UTILIZE 4 BYTES ∴ INCREMENT P.C. BY 4

TOKEN GENERATOR

FIELD OF THE INVENTION

The present invention relates to data processing systems and, more particularly, to an arrangement for disassembling a serial stream of instructions of variable length into the respective instructions that the processor uses in carrying out its operations.

BACKGROUND OF THE INVENTION

The field of electronic data processing systems has witnessed the development of sophisticated mechanisms for augmenting the power and flexibility of the computer by employing increased-size instruction formats. Since not all instructions require the maximum length that is affordable in such systems, variable length instruction formats have been developed in order to increase processing speed.

Present day data processing systems commonly employ processing implementations whereby the instructions are fetched sequentially from memory, one at a time, as they are needed for system operation. Typically, as each instruction is fetched from memory, it is stored in an instruction register and its contents are decoded to cause the computer to execute a particular data processing operation. In an effort to reduce processor operating time, lookahead or pre-fetching schemes have been developed, whereby the system begins fetching a new instruction from memory once it has begun executing a present instruction, the contents of the present instruction having been decoded, thereby permitting system operation to proceed. In the lookahead or prefetch approach, a series of instructions are loaded into sequential locations of a prefetch buffer, from which they are coupled one at a time to the instruction register. Where variable length instruction formats are employed, a problem arises in that there is no fixed memory alignment among the sequentially stacked instructions stored within the prefetch buffer, so that there exist the problems of first determining where each instruction begins and ends and then transferring the instruction from the buffer to the instruction register.

SUMMARY OF THE INVENTION

In accordance with the present invention, there is provided an instruction prefetch arrangement whereby instructions of variable length that have no alignment in the prefetch buffer, and thereby appear to the instruction register as an unending serial word stream, may be individually identified and separated into their respective components (or tokens) to permit transfer to the token register for decoding and execution.

To this end, the instruction format is such that each instruction consists of a token or series of tokens including a multibyte opcode followed by a number of variable length location tokens where applicable. As these successive instructions (or series of tokens) are received from main memory, they are serially loaded into the prefetch buffer. The instruction information is positioned in the prefetch buffer as a function of its memory address, and is retrieved using the program counter as a pointer. In order to determine the size of the token, so that it may be read out from the prefetch buffer and transferred to the token register, its opcode must be examined. For this purpose, a prescribed number of consecutive bytes stored in the prefetch buffer, including at least those of the first token, are transferred to a ring or loop-configured shift register, termed a "byte rotator", which functions as a temporary adjustable storage device. That portion of the byte rotator which contains the opcode token for each instruction read out of the prefetch buffer is decoded to determine the length of each token. Once the length of the first token is known, it can be determined where the second or next token begins. In the same fashion, each successive token is transferred to the byte rotator until all tokens for the current instruction have been utilized. The next token is the opcode for the following instruction.

Each of the stages of the prefetch buffer is coupled through multiplexer circuitry to the byte rotator with control of the multiplexer being defined in accordance with the respective lengths of the successive tokens transferred via the byte rotator to the token register. Each time the byte rotator is loaded with a new series of tokens, as multiplexed out of the prefetch buffer, its contents are rotated by an amount based upon the previous token length in order that the lowermost or first stage of the byte rotator will contain the next token of the instruction, whereby the above decoding procedure may again be carried out. The controlled rotation of the contents of the byte rotator also causes the sequence of tokens of the instruction to be transferred to the token register to be arranged in the proper order for transfer. Once the bytes of a token transferred to the byte rotator are in the proper order, the token is then transferred to the token register for decoding and system execution. By virtue of this selective read out of the instruction tokens from the prefetch buffer and their controlled rearrangement via the rotation capability of the byte rotator, the lack of alignment of the instructions within the prefetch buffer does not present a problem. Thus, both memory space is saved and processing speed is enhanced.

BRIEF DESCRIPTION OF THE DRAWINGS

FIG. 1 is a schematic block diagram of a token generator in accordance with the present invention;

FIG. 2 shows exemplary contents of the byte registers of the prefetch buffer of FIG. 1; and FIGS. 3A-3G show the byte contents of the byte rotator of FIG. 1 for a sequence of token generation operations based upon the exemplary contents of the prefetch buffer shown in FIG. 2.

DETAILED DESCRIPTION

Before describing, in detail, the token generator in accordance with the present invention, it is to be observed that the present invention resides primarily in a novel structural combination of conventional computer circuits, and not in the particular detailed configurations thereof. Accordingly, the structure, control, and arrangement of these conventional computer circuits have been illustrated in the drawings by readily understandable block representations and a schematic diagram which illustrates only those specific details that are pertinent to the present invention, in order not to obscure the disclosure with structural details which will be readily apparent to those skilled in the art having the benefit of the description herein. In addition, various portions of an electronic data processing system have been appropriately consolidated and simplified in order to emphasize those portions that are most pertinent to the present invention. Thus, the block diagram illustration of the Figure does not necessarily represent the mechanical structural arrangement of the exemplary token generator system, but is primarily intended to illustrate the major structural components of the system in a convenient functional grouping, whereby the present invention may be more readily understood.

Referring now to FIG. 1 of the drawings, there is shown a block diagram of the token generator employed within an electronic data processing system, in accordance with the present invention. The token generator is coupled to a multi-byte link 10 over which instructions fetched from main memory in a sequential fashion are transmitted. Link 10 is coupled to a prefetch buffer 40 comprised of a plurality of sections 11-18. Each prefetch buffer section contains a number of byte registers (four in the exemplary buffer section 11, as shown) the contents of which are selectively coupled to a looped shift register or byte rotator 41 through a respective multiplexer contained within each prefetch buffer section. Namely, within prefetch buffer section 11, there are four byte registers 11-1 . . . 11-4, the contents of individual ones of which are coupled by way of multiplexer 25 to a first byte section 1 of a byte rotator 41. In the example described herein, it is assumed that the maximum length of a token does not exceed sixty-four bits, so that in the eight prefetch buffer sections 11-18, each register will be of an eight bit capacity. While four single-byte registers 11-1 . . . 11-4 are shown as making up a single prefetch buffer section 11, it should be realized that more or less than this number may be employed in each buffer section to form the overall prefetch buffer. The number four has been chosen simply to facilitate the illustration of an exemplary embodiment of the prefetch buffer 40, here having a storage capacity of thirty-two bytes. As instructions fetched from main memory are delivered to the token generator, they are then loaded into the byte registers 11-1 . . . 18-4 of the prefetch buffer 40 in a serial fashion, in a manner to be explained more fully below in conjunction with FIG. 2.

As described briefly above, the present invention is capable of handling token lengths of sixty-four bits or less. Again, the number sixty-four is simply chosen as a example and it should be realized that the present invention has applicability to an instruction format of any number of bits, as long as there is taken into account an appropriate change in size and length of the sections of the generator to be described herein. In the present example, for a sixty-four bit capacity, namely an eight byte capacity, the outputs of eight byte sections 11-18 of the buffer 40 are coupled to an eight byte capacity byte rotator 41. Byte rotator 41 is comprised of a shift register sixty-four bits in length (namely, eight bytes of eights bits each) configured in a ring-around fashion by way of link 42, as shown. Links 51-58 couple the byte outputs of the multiplexers of each of the prefetch buffer sections 11-18 to respective byte segments 1-8 of the rotator 41.

In accordance with the operation of the present invention, the byte rotator 41 is controlled so as to arrange the order of the tokens of the instruction under consideration such that each token starts at the lowest byte position (within the first byte section 1) of the byte rotator 41. The length-specifying field of the opcode token is coupled over link 62 to a PROM 43, wherein the contents of the opcode length field are decoded to determine the length of each token. PROM 43 contains a decoding algorithm relating the manner in which a segment of the opcode portion of an instruction has been encoded to identify the token lengths. The length field of the opcode token is coupled over link 62 to PROM 43. This field may be binary encoded to specify the number of bytes of each token and this value is coupled over link 71 to adder 46 for updating the contents of a program counter 61. The output of the byte rotator 41 is coupled over the link 46 to token register 45. The output of PROM 43 is also coupled to a gating circuit 44 via link 63. Gating circuit 44 is coupled in the output link 65 from the token register 45. Gating circuit 44 is controlled in accordance with the information carried over link 63, in order to utilize selected ones of the bytes 1-8 within the token register 45. If the length of the token is the full eight bytes, gate circuit 44 will selectively couple all eight bytes from token register 45. On the other hand, if the length of the token is of a lesser number of bytes, for example, three bytes, gate circuit 44 will be controlled by link 63 to couple only the first three bytes, namely, bytes 1-3 of token register 45.

Control of the selective connection of the contents of the registers 11-1 . . . 18-4 of each prefetch buffer register section through its own multiplexer is achieved by a decoder 26, respective control links 31-38 from which are coupled to the multiplexer within respective prefetch buffer sections 11-18 of prefetch buffer 40. Decoder 26 may comprise a PROM or combinational logic for decoding the contents of program counter 61 into multiplexer selection control signals for coupling the next sequential eight bytes of instruction tokens stored in byte registers 11-1 . . . 18-4 of prefetch buffer 40, beginning with the byte whose location in the buffer is identified by the contents of the program counter 61, to byte rotator 41. Program counter 61 is further coupled by link 72 to the adder 46 which receives the output of the PROM 43, described previously. Link 72 is also coupled to byte rotator 41 for controlling the number of bytes through which the contents of the byte rotator are to be rotated in order to bring the next token of the instruction read out of the prefetch buffer into byte register 1 and to arrange the bytes of the next token in their proper order.

The output of adder 46 is coupled over link 73 to the input of the program counter 61. Through adder 46, the program counter 61 is continuously incremented in accordance with the output of PROM 43 which observes the contents of the opcode length field within each new instruction and updates or increases the count of the program counter 61 through adder 46 in accordance with the length or number of bytes of the new token to be coupled to the token register 45. Decoder 26 keeps track of the length of each token as it is received and the total length of the tokens as they are received in sequence in the prefetch buffer register and eventually coupled to the token register 45. To this end, as pointed out above, decoder 26 decodes the contents of the program counter 61 into a set of multiplexer control signals to be coupled over links 31-38 to selectively couple the byte registers of each of prefetch buffer sections 11-18 to the byte rotator 41 in the manner to be described below in conjunction with the description of FIGS. 2-3G.

It should be observed that the contents of the program counter 61 are also employed for determining the address of the instruction in a conventional sense. As the details of the creation of the address are not necessary for an understanding of the present invention, they will not be described here.

In order to facilitate an understanding of the operation of the token generator shown in block diagram form in FIG. 1, attention is directed to FIG. 2 and FIGS. 3A–3G, to be described in detail below.

FIG. 2 shows the contents of prefetch buffer 40, wherein a plurality of tokens 1, 2, . . . 8 of differing lengths have been loaded into the registers 11-1 . . . 18-4 of the prefetch buffer. Each byte is identified by a number and a subscript, the number identifying the token and the subscript identifying the byte of the token. Thus, for token number 1, the first byte $1_1$ is stored in register 11-1, the second byte $1_2$ is stored in register 12-1 and the third byte $1_3$ is stored in register 13-1. Prefetch buffer 40 has a capacity sufficient to handle, namely to store, the tokens as they are obtained from main memory. Once an instruction has been read out from prefetch buffer 40, and acted upon by the token register 45, those byte registers of buffer 40 which have been employed to store the tokens are then available to receive new tokens. However, since the prefetch buffer 40 is always loaded with four bytes at a time, no loading can take place until token number two has been stored in token register 45. Loading of prefetch buffer 40 occurs wh there are at least four bytes of previously used informatron in prefetch buffer 40. New information is returned from a cache memory and loading of prefetch buffer 40 is concurrent with instruction execution.

In its present state, prefetch buffer 40 is shown as being completely filled, containing seven complete tokens and at least the first two bytes of token number 8. The first token (number 1) is three bytes ($1_1$–$1_3$) in length, the second token is four bytes ($2_1$–$2_4$) in length, the third token is eight bytes ($3_1$–$3_8$) in length, the fourth and fifth tokens are each three bytes ($4_1$–$4_3$, $5_1$–$5_3$) in length, the sixth token is five bytes ($6_1$–$6_5$) in length and the seventh token is four bytes ($7_1$–$7_4$) in length. As mentioned previously, within the first byte of each instruction, the opcode length field specifies the length, namely the number of bytes of each token. Thus, within the opcode length field, there will be a code to be decoded by PROM 43 shown in FIG. 1 indicating that token number 1 contains three bytes.

Referring now to FIG. 3A, it will be initially assumed that the state of prefetch buffer 40 is as shown in FIG. 2, and the byte rotator 41 is empty. The contents of the program counter 61 are assumed to be cleared or reset to zero.

Within each of FIGS. 3A–3G, the state of the contents of byte rotator 41 is shown in successive load and rotate operations, to be described below, while the contents of the program counter 61 are tabulated in the right-hand portion of each figure. These contents of the program counter 61 are decoded by decoder 26 to control the selective operation of the multiplexers within prefetch buffer 40 for loading the byte rotator 41 with the next group of bytes stored in the prefetch buffer 40.

Looking now at FIG. 3A, initially, the contents of the program counter 61, being cleared to zero, cause decoder 26 to couple selection signals on lines 31–38 to the multiplexers in each prefetch buffer section 11–18, so as to transfer the contents of registers 11-1 . . . 18-1 into stages 1–8 of the byte rotator 41. Thus, bytes $1_1$–$1_3$ of the first token, bytes $2_1$–$2_4$ of the second token and the first byte $3_1$ of the third token will be loaded into stages 1–8 of byte rotator 41. Since the state of the program counter 61 is zero at this time, indicating a rotation of zero bytes (equated with no rotation) there is no ring shift via link 42 of the contents of the byte rotator 41.

PROM 43 decodes the opcode portion of byte $1_1$ of the first token made up of bytes $1_1$–$1_3$ and selectively enables gate circuit 44 to utilize the contents of only stages 1–3 of token register 45, i.e., the first token. As PROM 43 reads the opcode length field indicating that the first token contains three bytes, it delivers a code representing the length of the first token, namely the number 3, over link 71 to be added to the contents of the program counter 61 in adder 46. As a result, the contents of the program counter 61 are incremented by three from its original count of zero to a new total of three. Decoder 26 decodes the contents of the program counter 61 at the new value of three and places control signals on links 31–38, so that the multiplexers of buffer sections 11, 12, 13, 14, 15, 16, 17, and 18 the contents of respective registers 11-2, 12-2, 13-2, 14-1, 15-1, 16-1, 17-1 and 18-1 into stages 1–8 of the byte rotator 41. Namely, decoder 26 selectively enables the multiplexers within each of the sections 11–18 of the prefetch buffer register 40 to load the next eight bytes of the instruction sequence stored in the prefetch buffer 40. For the first token, three bytes $1_1$–$1_3$ were transferred to the token register 45, so that decoder 26 will selectively enable the multiplexers to couple the contents of byte registers 4–11 within the prefetch buffer 40 which contain token bytes $2_1$–$2_4$ and $3_1$–$3_4$.

Referring to FIG. 3B, this transfer of the instructions stored in prefetch buffer 40 is effected by loading the contents of registers 11-2, 12-2, and 13-2 together with the contents of registers 14-1, 15-1, 16-1, 17-1 and 18-1 into the byte rotator 41. With the transfer of these bytes into byte rotator 41, stages 1–8 of the byte rotator 41 respectively contain instruction bytes $3_2$, $3_3$, $3_4$, $2_1$, $2_2$, $2_3$, $2_4$ and $3_1$, as shown in FIG. 3B. The contents of the program counter 61, presently being the value 3, cause the byte rotator 41 to rotate its contents by a total of three bytes through ring-around link 42 which connects the first stage of the byte rotator 41 to its eighth stage. Upon completion of rotation by three bytes, the contents of the byte rotator 41 will have been shifted to the state shown in FIG. 3B, wherein byte stages 1–8 of byte rotator 41 contain the bytes $2_1$, $2_2$, $2_3$, $2_4$, $3_1$, $3_2$, $3_3$, and $3_4$, respectively.

PROM 43 decodes the contents of the opcode length field of the instruction which indicates that the second token is four bytes in length and selectively enables the gate circuit 44 to utilize the contents of only stages 1–4 of token register 45, i.e., the four bytes of the second token. The length of the second token, corresponding to four bytes, is transmitted over link 71 to adder 46, so as to update the contents of the program counter 61 from three to seven. Since the contents of the program counter 61 are presently at the value of seven, decoder 26 selectively controls the multiplexers of the prefetch buffer 40 to couple the next eight bytes beginning with the byte count stored in the program counter 61 to the byte rotator 41. Thus, bytes 8–15 within the prefetch buffer 40, corresponding to the contents of byte registers 18-1, 11-2, 12-2, 13-2, 14-2, 15-2, 16-2 and 17-2 will be coupled to respective stages 1–8 of byte rotator 41.

FIG. 3C shows the result of this transfer, wherein the order of the token bytes in the first through eighth stages of byte rotator 41 is $3_2$, $3_3$, $3_4$, $3_5$, $3_6$, $3_7$, $3_8$ and $3_1$. Since the current content of the program counter is the value 7, byte rotator 41 responds to this value in link 72 and rotates its contents by seven bytes, so as to bring the token containing byte $3_1$ of the third token into the first stage of the byte rotator 41, with the remaining seven bytes $3_2$–$3_8$ following in consecutive order in stages 2–8, as shown in FIG. 3C. PROM 43 decodes the opcode length field of the instruction to indicate to the program counter 61, via adder 46, that the third token is a maximum byte length token, of 64 bits or 8 bytes. The contents of the program counter 61 are then incremented to a new value of 15, corresponding to the sum of its previous value of seven and the new value of eight bytes for the third token. Decoder 26 decodes the value 15 to selectively connect register states 11-3, 12-3, 13-3, 14-3, 15-3, 16-3, 17-3 and 18-2 to the first through eighth byte stages 1–8 of byte rotator 41, corresponding to the next eight bytes of the contents of prefetch buffer 40 that are to be loaded into the byte rotator 41. Thus, the respective contents of these register stages, i.e., tokens $4_2$, $4_3$, $5_1$, $5_2$, $5_3$, $6_1$, $6_2$, $4_1$, shown in the top portion of FIG. 3D, are loaded into respective stages 1–8 of the byte rotator 41 and then rotated by an amount corresponding to the contents of the program counter 61. Since the byte rotator 41 has a length of eight byte stages, the contents of the program counter 61 can be reduced using modulo-8 conversion to a simple code for operating byte rotator 41. Thus, the value 15 in the program counter 61, coupled over link 72, in modulo-8, is equal to the value 7 in decimal form and the contents of the byte rotator are looped via link 42 to conduct a seven stage transfer or rotation resulting in the first byte $4_1$ of the fourth token occupying the first stage 1 of byte rotator 41 and the subsequent instruction tokens $4_2$, $4_3$, $5_1$, $5_2$, $5_3$, $6_1$, $6_2$, in ordered sequence as shown in FIG. 3D subsequent to rotation. PROM 43 decodes the opcode length field of the instruction to indicate that the fourth token is three bytes in length and the value 3 is added to the contents of the program counter 61 via adder 46. This increased content of the program counter 61 is decoded by decoder 26 to enable the selective addressing of registers 11-4, 12-4, 13-3, 14-3, 15-3, 16-3, 17-3 and 18-3 within the respective prefetch buffer sections 11–18 of buffer 40 in a fashion similar to that described previously.

Thus, for the next two transfers, tokens numbers 5 and 6 are selectively read out of the prefetch buffer 40 and rotated in the manner shown in FIGS. 3E and 3F as the contents of the program counter 61 are incremented and the registers of the prefetch buffer sections 11–18 are selectively coupled to the byte rotator 41 under the control of the decoder 26.

During the transfer of tokens from the byte rotator 41 to the token register 45, new instructions are being received by the prefetch buffer 40. These instructions are sequentially loaded into the byte registers of the sections of prefetch buffer 40 as the byte registers become available to receive new bytes. At the state shown in FIG. 3F, subsequent to the transfer of the five bytes, $6_1$–$6_5$ of the sixth token to the token register 45, there will be a total of 26 bytes that will have been transferred from the prefetch buffer 40 to the token register 45 for the first six tokens. This means that byte registers 11-1 . . . 18-1, 11-2 . . . 18-2, 11-3 . . . 18-3 will have been cleared to accept and be loaded with new instructions from main memory. It will be assumed for purposes of the present description that the eighth token contains three bytes, the third byte $8_3$ of which will have been loaded into register 11-1 of prefetch buffer section 11 subsequent to the read out of the tokens of the first instruction to byte rotator 41. Then, as shown in FIG. 3G, subsequent to the transfer of the sixth token (bytes $6_1$–$6_5$) to the token register 45, the third byte $8_3$ of the eighth token will have been loaded into the first register state 11-1 of prefetch buffer section 11. Decoder 26 will decode the contents of the program counter 61 at this time, equal to the value 26, and cause the twenty-seventh through thirty-fourth bytes stored in buffer 40 to be loaded into the byte rotator 41. Since the capacity of the prefetch buffer 40 is only 32 bytes, the thirty-third and thirty-fourth bytes will be obtained from the first two byte stages 11-1 and 12-1 which previously contained the first and second bytes $1_1$ and $1_2$ of the first token that had been transfered to the token register 45 in the sequence of operations shown in FIG. 3A already executed. Thus, the contents of the byte rotator 41, prior to rotation, will be those shown in FIG. 3G. Since the value of the program counter 61 is now equal to 26, subsequent to the incrementing of the counter by PROM 43 during the operation on the sixth token as shown in FIG. 3F, byte rotator 41 will shift its contents by a total of two bytes (corresponding to modulo-8 value of 26) to place the first byte $7_1$ of the seventh token in the first stage 1 of the byte rotator 41. Here, the seventh token is four bytes in length, as shown in FIG. 3G, and these four bytes $7_1$–$7_4$ are transferred to the token register 45. The program counter 61 is then incremented by a value of four and decoder 26 places a new set of signals on links 31–38 to cause the loading of the next group of bytes in the manner described previously.

The above operational scenario continues as new instructions of variable length are received from main memory and loaded into the prefetch buffer 40. For the generator shown in FIG. 1, each token need not be sixty-four bits in length, but may be of any length up to the maximum capacity of the number of sections of the prefetch buffer 40 and the byte rotator 41. Thus, there is no need to provide unused space between tokens of a lesser length to ensure alignment within the prefetch buffer 40, for subsequent transfer to the token register 45 and proper decoding and execution. Instead, through a very simple mechanism of decoding the length of each token and shifting and rotating the successive bytes from the prefetch buffer register 40 through the byte rotator 41 prior to the transfer to the token register 45, successive and rapid transfer of instructions for execution can be effected.

While we have shown and described one embodiment in accordance with the present invention, it is to be clearly understood that the same is susceptible of numerous changes and modifications as will be apparent to one skilled in the art.

What is claimed is:

1. For use in a data processing system wherein a sequence of data messages of variable length are to be processed, an arrangement for separating the individual data messages from each other for processing comprising:

a memory having a plurality of M storage sections, each storage section containing N memory stages thereby defining a matrix of NXM memory stages and into which memory stages successive data messages of variable length are coupled so as to be stored therein, with each respective section including means for coupling the contents of a selected one of the stages of that section to an output of said respective section;

first means, coupled to the outputs of the respective sections of said memory, for retrieving and storing in respective sections of said first means the contents of selected stages of predetermined ones of successive storage sections of said memory;

second means, coupled to said first means, for arranging the contents of said retrieved and stored selected stages of predetermined ones of successive storage sections of said memory as stored by said first means in a prescribed order, so that at least the contents of those selected stages of predetermined ones of successive storage sections of said memory in said first means which make up at least one complete data message are in sequence, said second means including means for specifying the length of said data message in terms of the number of stages therefor in said memory; and third means, coupled to said first and second means, for reading out a prescribed portion of the contents stored in said first means which forms said complete data message in response to said length specifying means.

2. An arrangement according to claim 1, wherein said first means includes means for controlling the selective coupling of the contents of selected stages of the storage sections of said memory to the outputs thereof in accordance with the length of said complete data message.

3. An arrangement according to claim 1, wherein said first means includes means for controlling the selective coupling of the contents of selected stages of the storage sections of said memory to the outputs thereof so that, for a respective storage section of said memory, the stages thereof are selectively coupled to the output of that section so as to couple successive data messages to said first means.

4. An arrangement according to claim 3 wherein said first means comprises storage register means having a plurality of register sections, the respective ones of which are coupled to the respective outputs of the respective storage sections of said memory, and are intercoupled in a ring flow path, and said second means comprises means for shifting the stored contents of said storage register means through said ring flow path until in the stages of said storage register means said stored contents occupy said prescribed order.

5. An arrangement according to claim 1, wherein said data messages comprise instructions to be executed by said data processing system.

6. An arrangement according to claim 5, wherein said memory comprises an instruction prefetch buffer into N stages of the M storage sections of which variable length instructions are coupled in sequence.

7. An arrangement according to claim 1, wherein a predetermined portion of each data message contains information specifying the length of the message and wherein said third means includes means for reading out said prescribed portion of the arranged contents stored by said first means in accordance with said predetermined portion.

8. An arrangement according to claim 7, wherein said first means comprises storage register means having a plurality of register sections, the respective ones of which are coupled to the respective outputs of the respective storage sections of said memory, and are intercoupled in a ring flow path, and said second means comprises means for shifting the stored contents of said storage register means through said ring flow path until in the stages of said storage register means said stored contents occupy said prescribed order.

9. An arrangement according to claim 8, wherein said second means comprises means for shifting the stored contents of said storage register means through said ring flow path based upon the length of the previous data message segment read out by said third means as said prescribed portion of the contents stored by said storage register means.

10. An arrangement according to claim 9, wherein said second means comprises counter means for counting the number of said message segments read out by said third means from said storage register means, and means, responsive to the contents of said counter means, for shifting the stored contents of said storage register means through said ring flow path based upon the length of the previous data message segment read out by said third means as said prescribed portion of the contents stored by said storage register means.

11. For use in a data processing system wherein a sequence of data messages of variable length are to be processed, a method for separating the individual data messages from each other for processing comprising the steps of:

(a) coupling successive data messages of said sequence to a memory, said memory having a plurality of M storage sections, each storage section containing N memory stages thereby defining a matrix of NXM memory stages and into which memory stages said successive data messages of variable length are coupled so as to be stored therein;

(b) retrieving and storing, in respective sections of a storage register, the contents of selected stages of predetermined ones of successive storage sections of said memory;

(c) arranging said retrieved and stored selected stages of predetermined ones of successive storage sections of said memory as stored by said storage register in a prescribed order, so that at least the contents of those selected stages of predetermined ones of successive storage sections of said memory which make up at least one complete data message are in sequence;

(d) specifying the length of said data message in terms of the number of stages therefor in said memory;

(e) reading out a prescribed portion of the contents stored in said storage register which forms said complete data message in accordance with the length specified in step (d); and (f) during the read out of said complete data message from said storage register in step (e), sequentially loading said selected stages of said predetermined ones of successive storage sections of said memory with new message portions of said sequence of data messages.

12. A method according to claim 11, wherein said data messages comprise instructions to be executed by said data processing system.

13. A method according to claim 12, wherein said memory comprises an instruction prefetch buffer into N stages of the M storage sections of which variable length instructions are coupled in sequence.

14. A method according to claim 11, wherein step (b) includes controlling the selective coupling of the contents of selected stages of the storage sections of said memory to said respective sections of said storage register in accordance with the length of said complete data message.

15. A method according to claim 11, wherein step (b) includes controlling the selective coupling of the contents of selected stages of the storage sections of said memory to said respective sections of said storage register so that, for a respective storage section of said memory, the stages thereof are selectively coupled to the output of that section so as to couple successive data messages to said storage register.

16. A method according to claim 15, wherein said storage register has a plurality of register sections, respective ones of which are coupled to respective outputs of the respective storage sections of said memory and are intercoupled in a ring flow path, and step (c) comprises shifting the stored contents of said storage register through said ring flow path until in the stages of said storage register said stored contents occupy said prescribed order.

17. A method according to claim 11, wherein a predetermined portion of each data message contains information specifying the length of the message and wherein step (e) includes reading out said prescribed portion of the arranged contents stored by said storage register in accordance with said predetermined portion.

18. A method according to claim 17, wherein step (b) includes controlling the selective coupling of the contents of selected stages of the storage sections of said memory to said respective sections of said storage register so that, for a respective storage section of said memory, the stages thereof are selectively coupled to the output of that section so as to couple successive data messages to said storage register.

19. A method according to claim 18, wherein step (c) comprises shifting the stored contents of said storage register through said ring flow path based upon the length of the previous data message segment read out in step (e) as said prescribed portion of the contents stored by said storage register.

20. A method according to claim 18, wherein step (c) comprises counting the number of said message segments read out in step (e) from said storage register and shifting the stored contents of said storage register through said ring flow path based upon the length of the previous data message segment read out in step (c) as said prescribed portion of the contents stored by said storage register.

* * * * *